United States Patent
Bakulin et al.

(10) Patent No.: US 11,573,342 B2
(45) Date of Patent: Feb. 7, 2023

(54) SYSTEMS AND METHODS TO ENHANCE 3-D PRESTACK SEISMIC DATA BASED ON NON-LINEAR BEAMFORMING IN THE CROSS-SPREAD DOMAIN

(71) Applicants: Saudi Arabian Oil Company, Dhahran (SA); Trofimuk Institute of Petroleum Geology and Geophysics, Novosibirsk (RU)

(72) Inventors: Andrey Bakulin, Dhahran (SA); Maxim Dmitriev, Dhahran (SA); Ilya Silvestrov, Dhahran (SA); Vladimir Tcheverda, Novosibirsk (RU); Dmitry Neklyudov, Novosibirsk (RU); Maxim Protasov, Berdsk (RU); Kirill Gadylshin, Novosibirsk (RU)

(73) Assignees: Saudi Arabian Oil Company, Dhahran (SA); Trofimuk Institute of Petroleum Geology and Geophysics, Novosibirsk (RU)

( * ) Notice: Subject to any disclaimer, the term of this patent is extended or adjusted under 35 U.S.C. 154(b) by 171 days.

(21) Appl. No.: 16/968,433

(22) PCT Filed: Feb. 8, 2018

(86) PCT No.: PCT/RU2018/000079
§ 371 (c)(1),
(2) Date: Aug. 7, 2020

(87) PCT Pub. No.: WO2019/156586
PCT Pub. Date: Aug. 15, 2019

(65) Prior Publication Data
US 2020/0400847 A1 Dec. 24, 2020

(51) Int. Cl.
*G01V 1/36* (2006.01)
*G01V 1/00* (2006.01)

(52) U.S. Cl.
CPC .............. *G01V 1/362* (2013.01); *G01V 1/006* (2013.01); *G01V 2210/512* (2013.01); *G01V 2210/52* (2013.01)

(58) Field of Classification Search
None
See application file for complete search history.

(56) References Cited

U.S. PATENT DOCUMENTS

| 3,597,727 A | 8/1971 | Judson et al. |
| 3,806,863 A * | 4/1974 | Tilley ................. G01V 1/3808 367/21 |

(Continued)

FOREIGN PATENT DOCUMENTS

| CN | 102109612 | 6/2011 |
| CN | 102478671 | 5/2012 |

(Continued)

OTHER PUBLICATIONS

Bakulin et al., "Application of supergrouping to enhance 3D prestack seismic data for a desert environment," the Leading Edge, Mar. 2018, 8 pages.

(Continued)

*Primary Examiner* — Lina M Cordero
(74) *Attorney, Agent, or Firm* — Fish & Richardson P.C.

(57) ABSTRACT

The disclosure provides systems and methods to enhance pre-stack data for seismic data analysis by: sorting the reflection seismic data acquired from cross-spread gathers into sets of data sections; performing data enhancement on the sets of data sections to generate enhanced traces by: (i) applying forward normal-moveout (NMO) corrections such that arrival times of primary reflection events become more flat, (ii) estimating beamforming parameters including a nonlinear traveltime surface and a summation aperture, (iii) generating enhanced traces that combine contributions from original traces in the sets of data sections, and (iv) applying (Continued)

inverse NMO corrections to the enhanced traces such that temporal rearrangements due to the forward NMO corrections are undone.

6 Claims, 8 Drawing Sheets

(56) References Cited

U.S. PATENT DOCUMENTS

| | | | | |
|---|---|---|---|---|
| 6,876,599 | B1* | 4/2005 | Combee | G01V 1/3808 367/20 |
| 7,379,386 | B2* | 5/2008 | Muyzert | G01V 1/38 367/63 |
| 2008/0049551 | A1* | 2/2008 | Muyzert | G01V 1/38 702/14 |
| 2017/0269246 | A1* | 9/2017 | Anderson | G01V 1/366 |

FOREIGN PATENT DOCUMENTS

| | | |
|---|---|---|
| CN | 106443787 | 2/2017 |
| WO | WO 2019156586 | 8/2019 |
| WO | WO 2021020984 | 2/2021 |

OTHER PUBLICATIONS

Bakulin et al., "Nonlinear beaforming for enhancing prestack seismic data with a challenging near surface or overburden," Data Processing & Machine Learning, Dec. 2018, 6 pages.
Billete et al., "Practical aspects and applications of 2D stereotomography," Geophysics, May 2003, 68(3):1008-1021, 14 pages.
Bishop et al., "Tomographic determination of velocity and depth in laterally varying media," Geophysics, Jun. 1985, 50(6):903-923, 22 pages.
Duveneck, "Tomographic determination of seismic velocity models with kinematic wavefield attributes," Zur Erlangung des akademischen Grades eines, Doktors De Naturwissenschaften von der Fakultat fur Physik der Universitat Karlsruhe (TH) genehmigte, Dissertation von Dipl.-Geophys., Jun. 2004, 201 pages.
Duveneck, "Tomographic velocity model estimation with data-derived first and second travel time derivatives," presented at the 8th International Congress of the Brazilian Geophysical Society, Brazil, Sep. 14-18, 2003, 4 pages.
Duveneck, "Velocity model estimation with data-derived wavefront attributes," Geophysics, Jan. 2004, 69(1):265-274, 10 pages.
Fagin, "Model based depth imaging," Society of Exploration Geophysics, Course Notes Series No. 10, Tulsa, USA, 1999, 184 pages.
Gjoystdal et al., "Inversion of reflection times in three dimensions," Geophysics, Jul. 1981, 46(7):972-983, 12 pages.
Hubral et al., "Interval Velocities from Seismic Reflection Time Measurements," Society of Exploration Geophysicists, 1980, 214 pages.
Jones, "Estimating subsurface parameter fields for seismic migration: Velocity model building," Seismic velocity/statics, Oct. 2015, 24 pages.
Klüver, "Velocity model building using migration to residual time," SEG Technical Program Expanded Abstracts, SEG/New Orleans 2006 Annual Meeting, 5 pages.
Lambaré et al., "Multi-layer non-linear slope tomography," 75th Annual International Conference and Exhibition, EAGE, Extended Abstracts, London, Jun. 10-13, 2013, 5 pages.
Lambaré, "Stereotomography," Geophysics, Sep. 2008, 73(5):VE25-VE34, 10 pages.
Lavaud et al., "Automatic robust velocity estimation by poststack stereotomography," SEG Technical Program Expanded Abstracts 2004, SEG International Exposition and 74th Annual Meeting, Oct. 10-15, 2004, 4 pages.
Neckludov et al., "Residual stereotomographic inversion," Geophysics, Jul. 2006, 71(4):E35-E39, 6 pages.

Tanushev et al., "Fast, high-resolution beam tomography and velocity-model building," The Leading Edge, Feb. 2017, 36(2):140-145, 6 pages.
Van Der Made et al., "Estimation of complex velocity models from stacking information," SEG Technical program Expanded Abstracts, 1987, 3 pages.
Woodward et al., "A decade of tomography," Geophysics, Sep.-Oct. 2008, 73(5), 7 pages.
PCT International Search Report and Written Opinion in International Appln. No. PCT/RU2019/000336, dated Feb. 26, 2020, 14 pages.
Bakulin et al., "Application of supergrouping to land seismic data in desert environment," SEG International Exposition and 86th Annual Meeting, 2016, 5 pages.
Bakulin et al., "Nonlinear beamforming for enhancing pre-stack data with challenging near surface or overburden," SEG Technical Program Expanded Abstracts, Aug. 2017, 5 pages.
Baykulov et al., "Prestack seismic data enhancement with partial common-reflection-surface (CRS) stack," Geophysics, May-Jun. 2009, 74(3):49-58.
Berkovitch et al., "How non-hyperbolic MultiFocusing improves depth imaging," First Break, Sep. 2011, 29:95-103.
Buzlukov et al., "Imaging improvement by prestack signal enhancement," Geophysical Prospecting, 2013, 61:1150-1158.
Buzlukov et al., "Prestack data enhancement using local traveltime approximation," 72nd EAGE Conference & Exhibition incorporating EUROPEC, Barcelona, Spain, Jun. 14-17, 2010, 5 pages.
Hoecht et al., "Operator-oriented CRS interpolation," Geophysical Prospecting, 2009, 57:957-979.
Khaidukov et al., "Enhancement of seismic data gathered by floating ice acquisition: application of local kinematic attributes," SEG International Exposition and 86th Annual Meeting, 2016, 5 pages.
Neklyudov et al., "Intra-array statics and phase corrections obtained by beaforming in the short-time fourier transform domain: application to supergrouping," SEG International Exposition, 2017, 6 pages.
Zhang et al., "Common-reflection-surface (CRS) stack for common offset," Geophysical Prospecting, 2001, 49:709-18.
PCT International Search Report and Written Opinion in International Appln. No. PCT/RU2018/000079, dated Dec. 6, 2018, 12 pages.
U.S. Appl. No. 17/595,365, filed Nov. 15, 2021, Bakulin et al.
U.S. Appl. No. 17/630,654, filed Jan. 27, 2022, Bakulin et al.
U.S. Appl. No. 17/630,663, filed Jan. 27, 2022, Bakulin et al.
U.S. Appl. No. 17/630,665, filed Jan. 27, 2022, Bakulin et al.
Alsteris et al., "Short-time phase spectrum in speech processing: A review and some experimental results," Digital Signal Processing, 2007, 17:578-616, 39 pages.
Curia et al., "The impact of multifocusing in the processing of land 3D seismic data in a fold and thrust belt setting: Ranquil Norte Block, Neuquén Basin, Argentina," The Leading Edge, 2013, 36(9):770-774, 5 pages.
Digital Signal Processing, Blackledget, Horwood Publishing, 2006, 2nd ed., 840 pages.
Erdogan et al., "Phase-sensitive and recognition-boosted speech separation using deep recurrent neural networks," Proc. Int. Conf, Acoust., Speech, Signal Process., 2015, 708-712, 5 pages.
Li et al., "A low rank approximation method for ice-break noise attenuation of simultaneous vibroseis data," SEG Technical Program Expanded Abstracts, Aug. 2017, 5 pages.
Liang et al., The optimal ratio time-frequency mask for speech separation in terms of the signal-to-noise ratio, The Journal of the Acoustical Society of America, 2013, 134(5):EL452, 8 pages.
Lichman et al., "Automated Phase-based Moveout Correction," 69th SEG Annual International Meeting, Expanded Abstracts, 2000, 5 pages.
Lichman et al., "Phase Inversion Deconvolution for Surface Consistent Processing and Multiple Attenuation," SEG Annual International Meeting, Expanded Abstracts, 1999, 4 pages.

(56) References Cited

OTHER PUBLICATIONS

Martin et al., "Noise Power Spectral Density Estimation Based on Optimal Smoothing and Minimum Statistics," IEEE Transactions on Speech and Audio Processing, Jul. 2001, 9(5):504-512, 9 pages 512.

Mueller et al., "Improving Prestack Migration with CRS Techniques—A Case Study," 72nd EAGE Conference and Exhibition, Expanded Abstract, Jun. 2010, 5 pages.

Robinson et al., "Geophysical signal analysis," Society of Exploration Geophysicists, 2000, 481 pages.

Ulrych et al., "The essence of phase in seismic data processing and inversion," 77th SEG Annual Meeting, Expanded Abstracts, 2007, 1765-1769, 5 pages.

Wang et al., "Time-frequency masking for speech separation and its potential for hearing aid design," Trends in Amplificat., 2008, 12:332-353, 22 pages.

Wikipedia.com [online], "Median filter," Last edited Sep. 10, 2021 retrieved Apr. 8, 2022, retrieved from URL <https://en.wikipedia.org/wiki/Median_filter>, 4 pages.

Williamson et al., "Time-Frequency Masking in the Complex Domain for Speech Dereverberation and Denoising," IEEE/ACM Transactions on Audio, Speech and Language Processing, May 2016, 13(9):1-10, 10 pages.

Yilmaz et al., "Blind separation of speech mixtures via time-frequency masking," IEEE Trans. Signal Process, Jul. 2004, 52(7):1830-1846, 19 pages.

PCT International Search Report and Written Opinion in International Appln. No. PCT/RU2019/000532, dated Apr. 3, 2020, 17 pages.

PCT International Search Report and Written Opinion in International Appln. No. PCT/RU2019/000534, dated Apr. 3, 2020, 17 pages.

PCT International Search Report and Written Opinion in International Appln. No. PCT/RU2019/000533, dated Apr. 8, 2020, 13 pages.

* cited by examiner

SYSTEMS AND METHODS TO ENHANCE 3-D PRESTACK SEISMIC DATA BASED ON NON-LINEAR BEAMFORMING IN THE CROSS-SPREAD DOMAIN

CLAIM OF PRIORITY

This application claims priority to International Patent Application No. PCT/RU2018/000079 filed on Feb. 8, 2018, the entire contents of which are hereby incorporated by reference.

BACKGROUND

Seismic data contains information about various geological features. Seismic data can be obtained from seismic surveys to image geological structures of a subterranean region. Poststack seismic data can include two-dimensional (2D) seismic slices or three-dimensional (3D) seismic volumes. Prestack data can have higher dimensions including source and receiver positions arranged in orthogonal directions. Seismic data can be used to identify geologic structural and stratigraphic features, such as subsurface faults, and unconformities. For a geophysicist, complex geology is characterized by an abrupt or sharp contrast in lateral or vertical velocity (for example a sudden change in rock type or lithology which causes a sharp change in seismic wave velocity). Some examples of what a geophysicist considers complex geology are: faulting, folding, (some) fracturing, salt bodies, and unconformities.

SUMMARY

The present disclosure describes a new method for enhancement of 3D prestack land seismic data corrupted by challenging near-surface or overburden. Implementations may include a first stage of sorting seismic data obtained by typical land orthogonal acquisition into a set of cross-spread gathers. These implementations may include a second stage of applying, for each cross-spread gather, forward normal-moveout corrections (NMO) to make primary reflections arrivals more flat than before the application. These implementations may include a third stage of performing, for each cross-spread gather, a procedure for estimation beamforming parameters that define nonlinear traveltime surface for optimal stacking. These implementations may include a fourth stage of performing beamforming by fast and efficient local stacking of traces in each cross-spread gather along the estimated traveltime surface. These implementations may include a fifth stage of applying inverse NMO correction to restore temporal arrangement of the original data traces prior to the forward moveout. Through the sequence of steps, some implementations are free from classical assumptions about the hyperbolicity of reflective events from layered structures. Yet, these implementations can still use the available stacking velocity as a guide to enhance primary reflections and to suppress other unwanted events such as multiples. As demonstrated by feasibility studies on real data, these implementations can make full use of the vast amount of seismic data from modern high-channel count sensor systems, thereby revealing more usable information from the modern land data surveys.

Implementations according to the present disclosure may be realized in computer implemented methods, hardware computing systems, and tangible computer readable media. For example, a system of one or more computers can be configured to performed particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The subject matter described in this specification can be implemented to realize one or more of the following advantages. The described subject matter can improve the coherency and visibility of reflected events and overall improve signal to noise ratio. This may lead to better velocity analysis results and other improvements during prestack data processing steps such as scaling, deconvolution and residual static corrections. Other advantages will be apparent to those of ordinary skill in the art.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
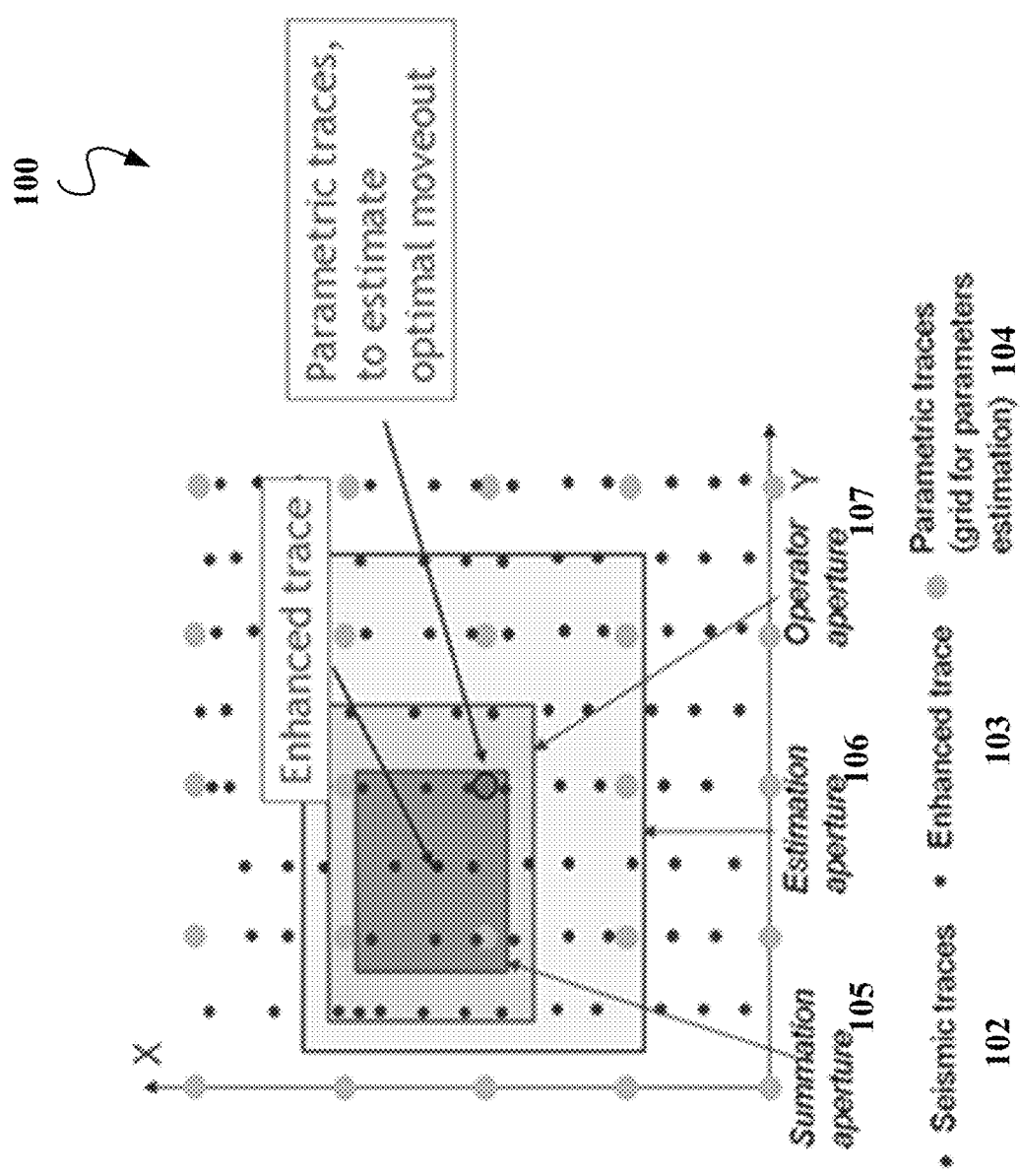
FIG. 1 illustrates an example of relative placement of various traces (including seismic traces, parametric traces, and an enhanced trace) and various apertures (including the summation aperture, the operator aperture, and the estimation aperture) on a grid of X (horizontal) and Y (vertical) coordinates for analyzing and enhancing reflection seismic data.

A seismic method has three principal applications, namely, delineation of near-surface geology for engineering studies, and coal and mineral exploration within a depth of up to about 1 kilometer (km) (known as engineering seismology); hydrocarbon exploration and development within depth of approximately 10 km (known as exploration seismology); and investigation of the earth's crustal structure within a depth of approximately 100 km (known as known as earthquake seismology). A reflection seismic method has been used to delineate subsurface geology in different studies.

A typical reflection seismic method generally involves acquiring reflection seismic data in response to a shot input (for example, from shot sources that direct acoustic impulses into the earth) and then analyzing the reflection seismic data, as acquired from, for example, recording instruments/devices such as hydrophones, to obtain insight of the layered structures underneath the earth. An array of shot sources and an array of recording instruments may be used. The seismic data recorded in digital form by each channel of the array of the recording instruments are represented by a time series. Processing algorithms can be designed for and applied to either single channel time series, individually, or multichannel time series.

Some implementations described in this disclosure provide data enhancement when 3D pre-stack land seismic data is corrupted by challenging near-surface and overburden conditions. These implementations may search for local coherent events in the data in the cross-spread domain and then perform partial summation along the estimated trajectories. For example, such implementations may incorporate a first step of sorting seismic data obtained by land orthogonal acquisition (in which the shot sources and the receiving instruments may be arranged in line shapes that are substantially orthogonal to each other) into a set of cross-spread gathers. These implementations may incorporate a second step of applying, for each cross-spread gather, forward normal-moveout corrections (NMO) to make primary reflections arrivals more flat than before the NMO correction. These implementations may further incorporate a third step of performing, for each cross-spread gather, a procedure for estimating beamforming parameters that defines a non-linear traveltime surface for improved local stacking. These implementations may additionally incorporate a fourth step of performing beamforming by fast and efficient local stacking of traces in each cross-spread gather along the estimated traveltime surface. These implementations may subsequently incorporate a fifth step of applying inverse NMO correction to restore the arrangements in the original reflection seismic data prior to the forward moveout. Thereafter, the implementations may proceed with additional data enhancement such as deconvolution, followed by stacking and migration such that the final processed results are displayed for visualization. These implementations may advantageously operate without the classical assumptions about hyperbolicity of seismic events. However, such implementations may use the available stacking velocity as a guide to enhance primary reflections and to suppress other unwanted events such as multiples. Feasibility studies demonstratively show promising results from real data. Indeed, various implementations are fully conducive for modern reflection seismic data acquired with high-channel count. As such, these implementations can advantageously make full use modern signal-sensor data that are densely sampled and voluminous in nature.

Figure 2:
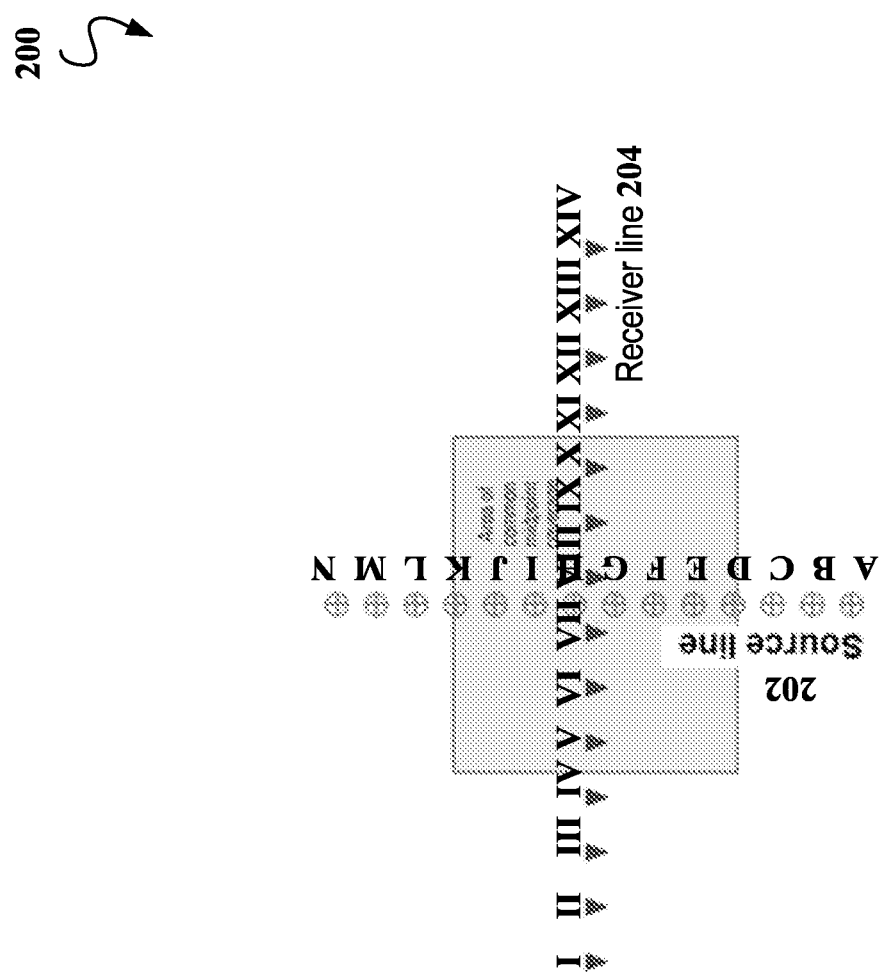
FIG. 2 is a diagram illustrating an example of a configuration for placing a source line to transmit acoustic impulses for probing the earth and a receiver line for receiving acoustic reflections in a cross-spread seismic gather.
Figure 3:
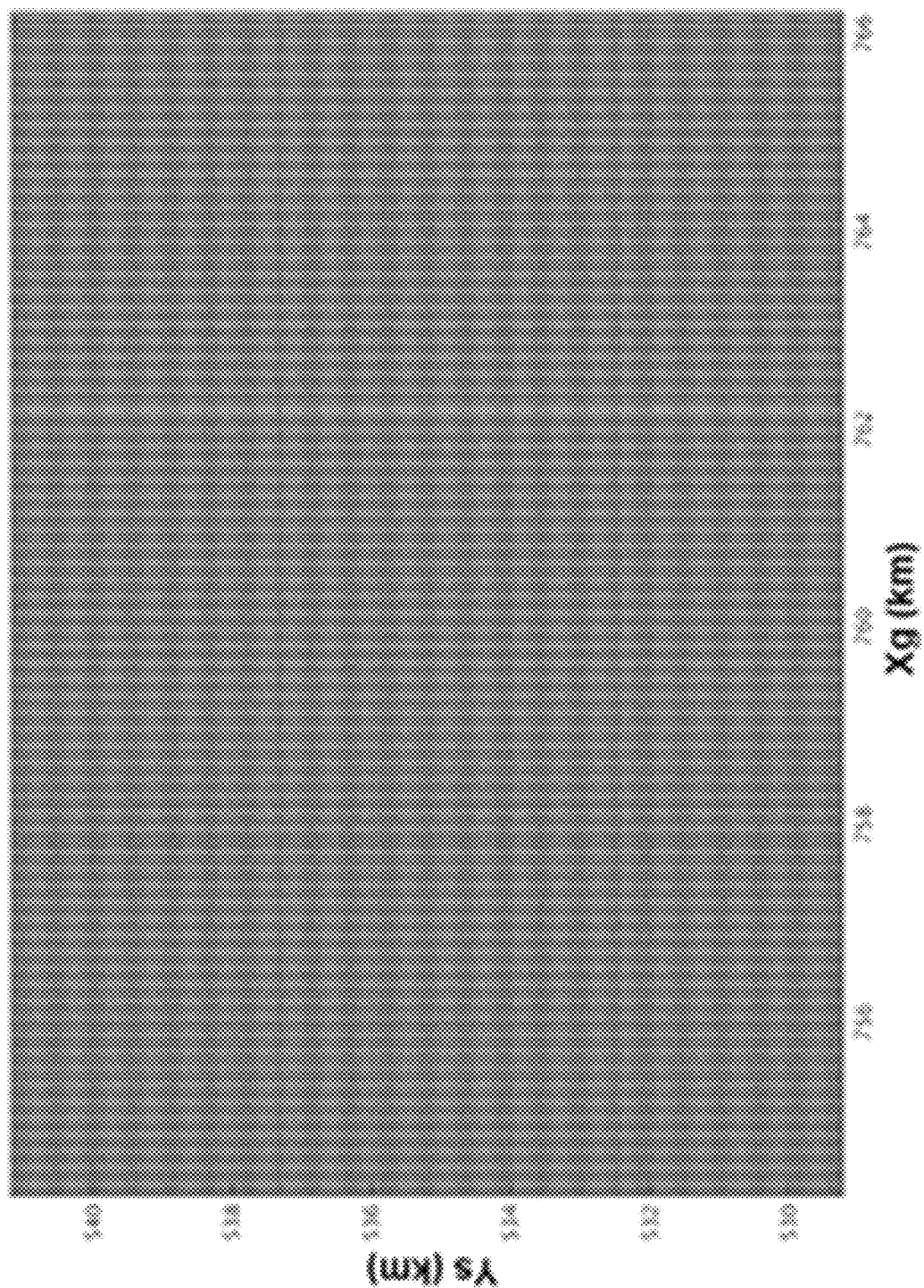
FIG. 3 is a diagram showing an example of trace distribution for acquiring reflection seismic signals in the plane representing a receiver placement on the X (horizontal) coordinate and a source placement on the Y (vertical) coordinate for the cross-spread gather of FIG. 2.
Figure 4A:
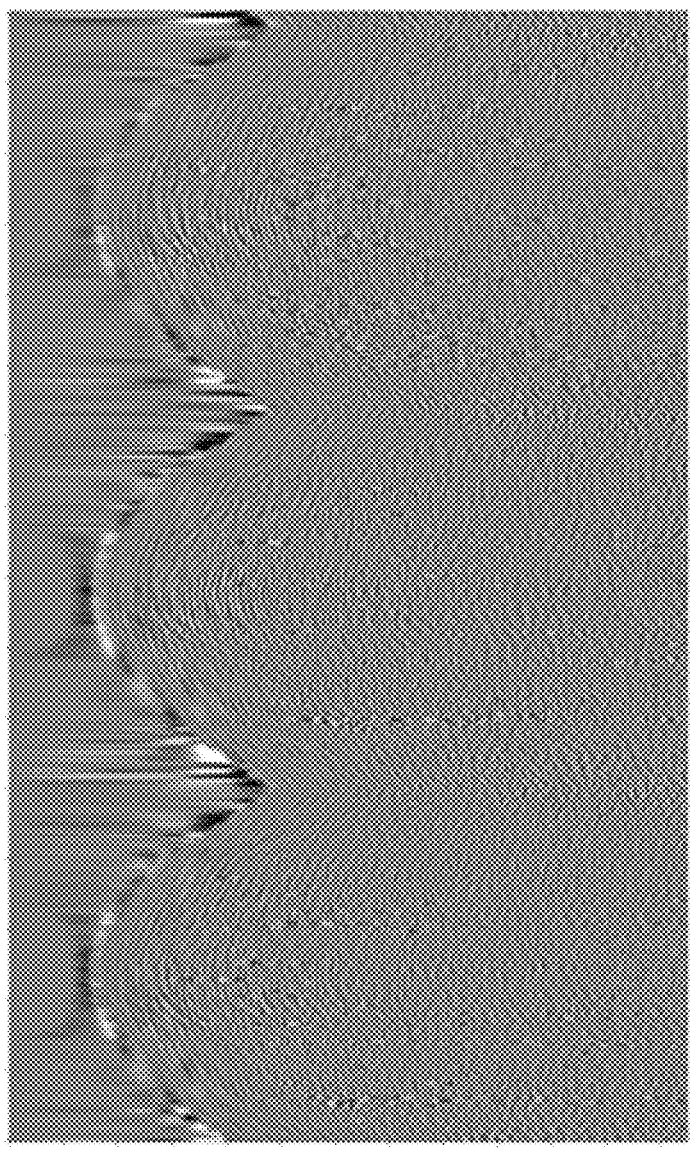
FIG. 4A shows an example of a fragment of cross-spread gather traces before enhancement.
Figure 4B:
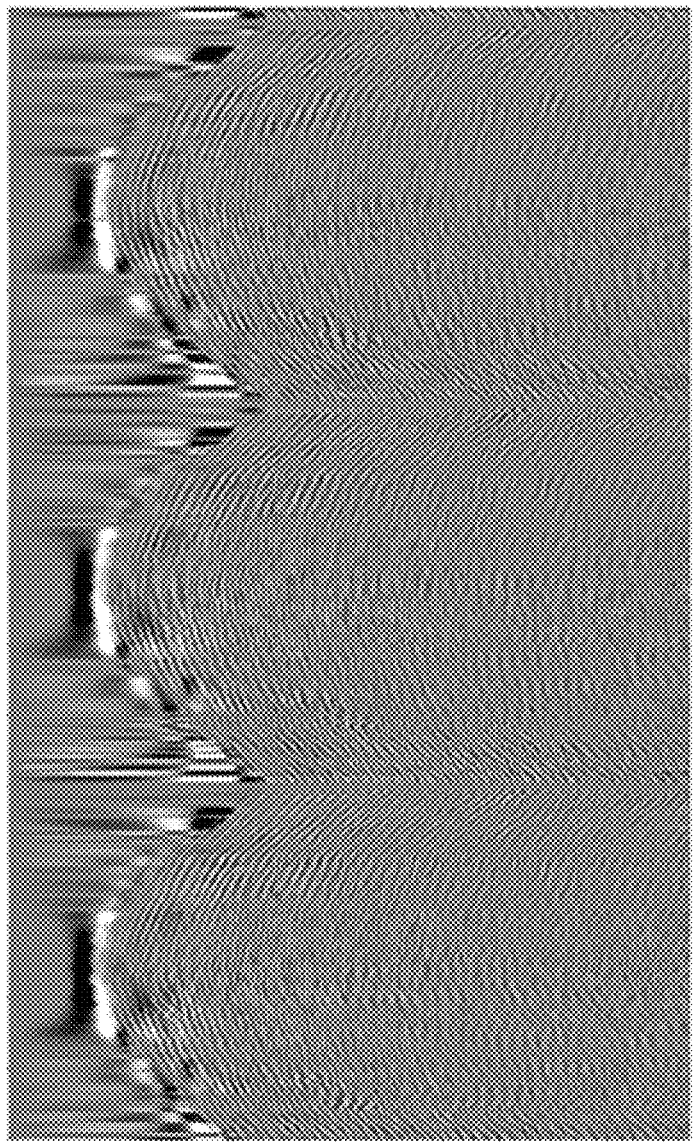
FIG. 4B shows the example of the fragment of cross-spread gather traces after enhancements according to some implementations of the present disclosure.
Figure 5A:
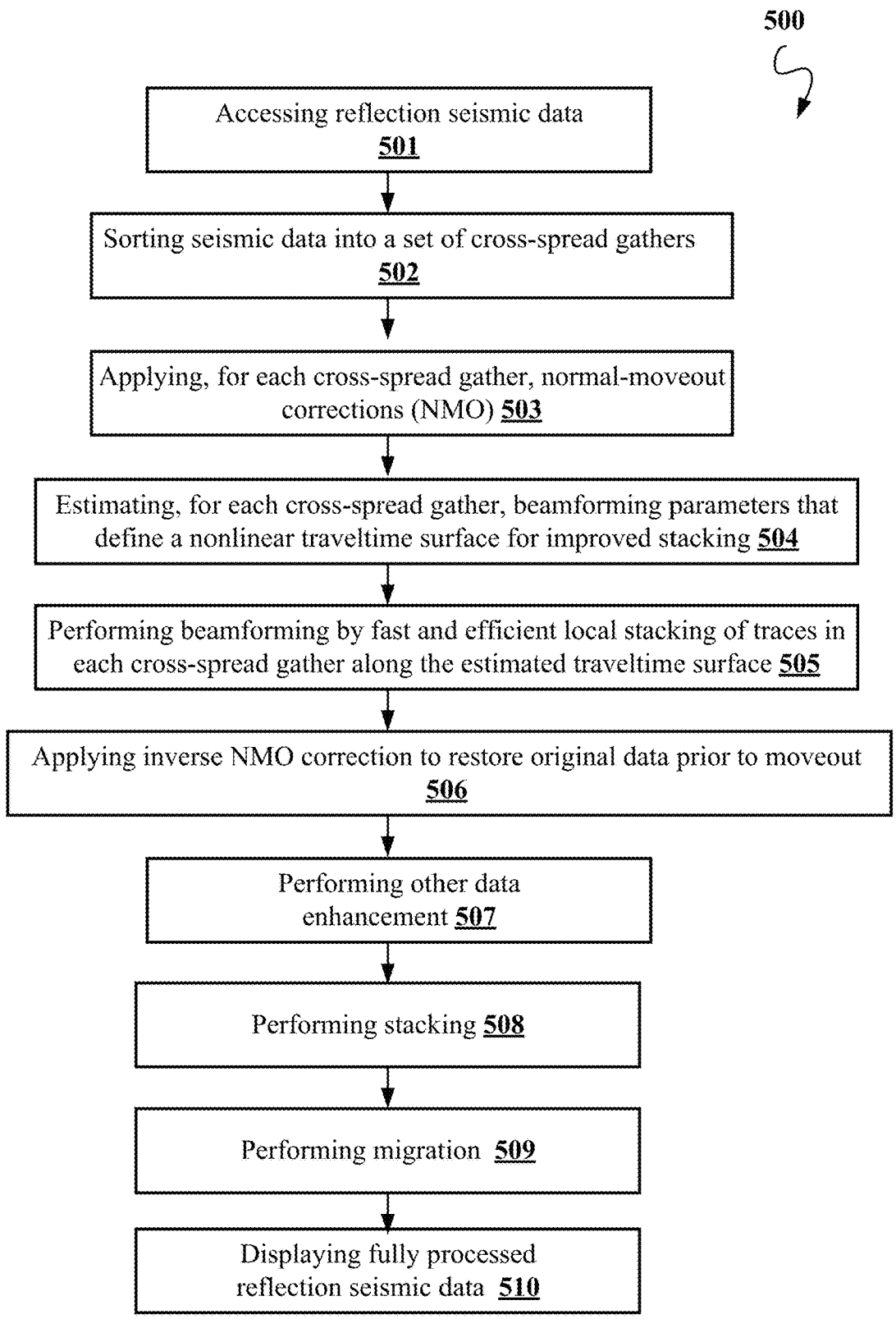
FIG. 5A is a flowchart showing an example of data enhancement according to some implementations of the present disclosure.
Figure 5B:
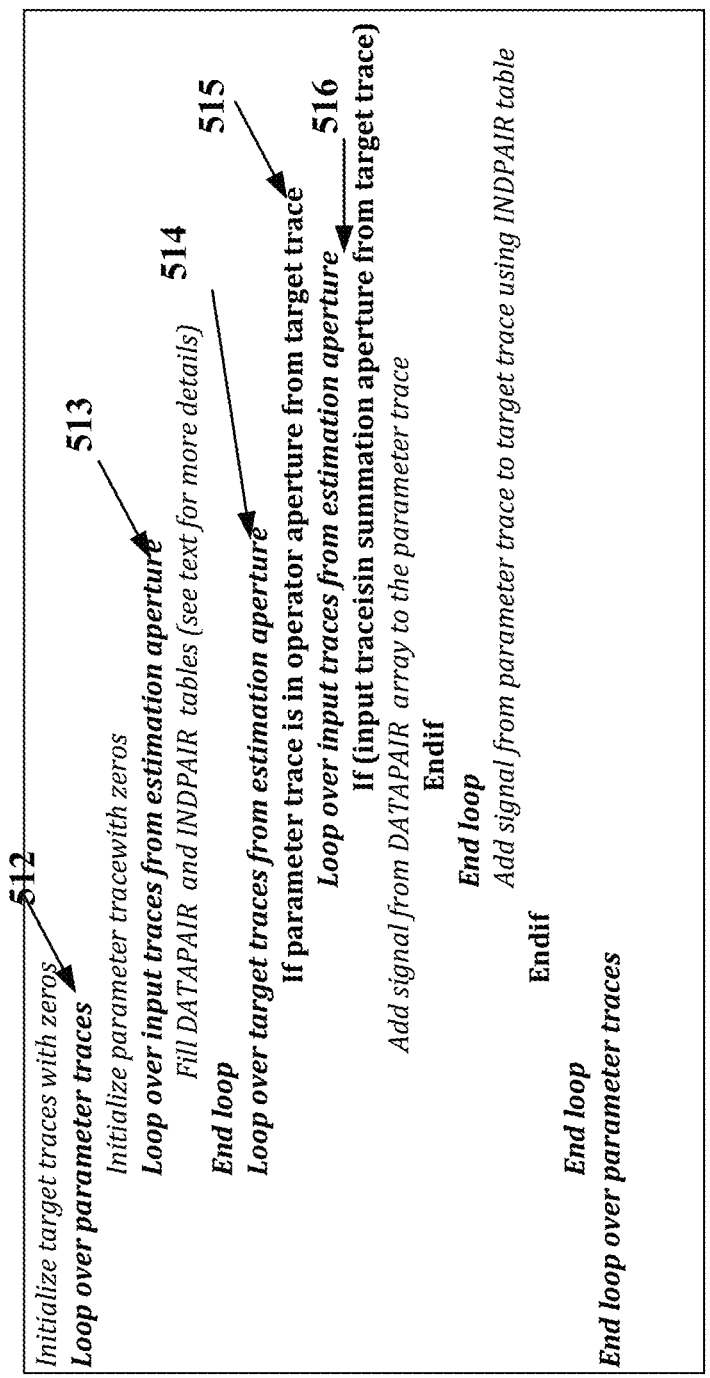
FIG. 5B is a diagram showing an example of high-level pseudocodes for some implementations of the present disclosure.
Figure 6:
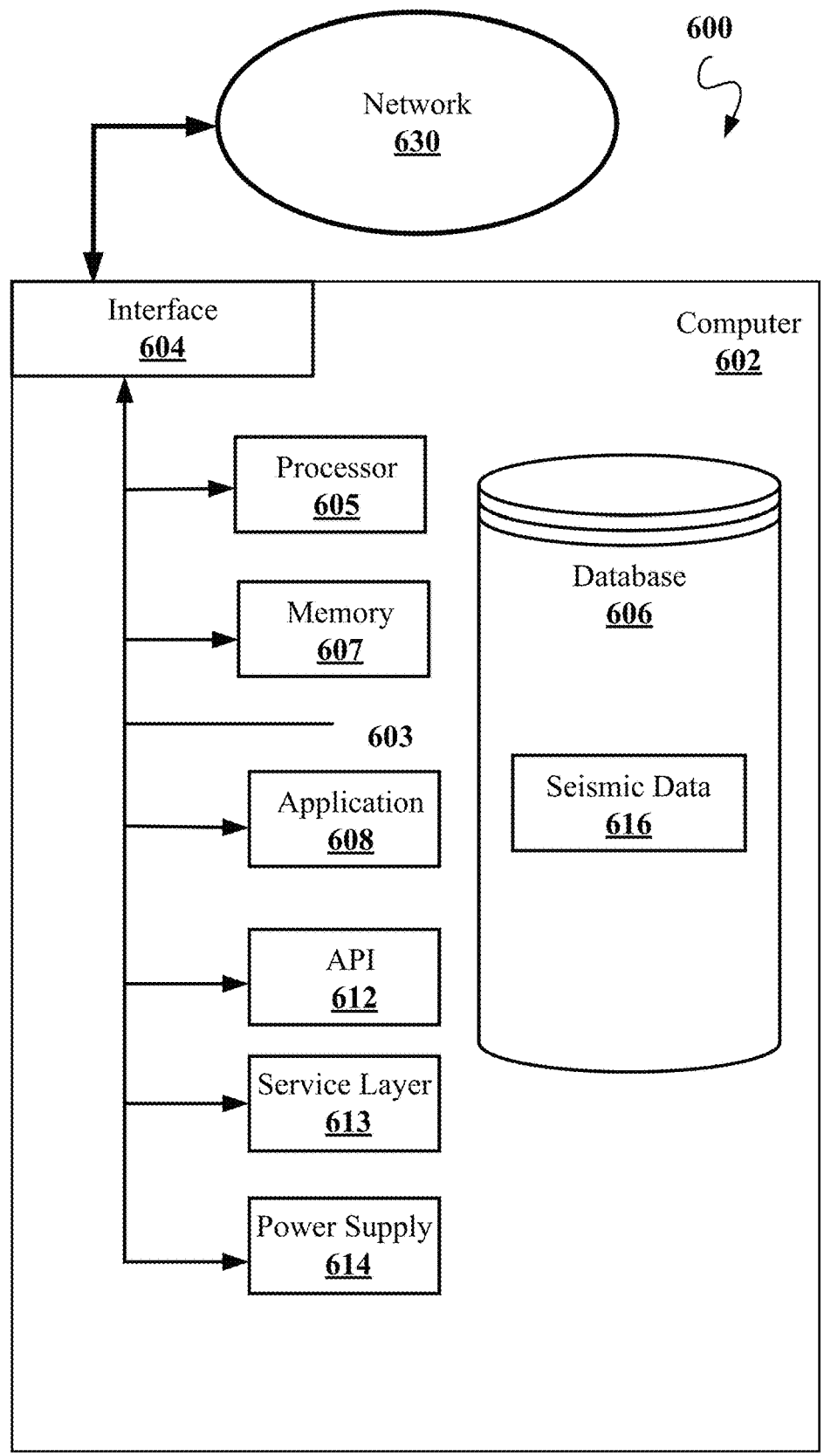
FIG. 6 is a block diagram illustrating an example of a computer system used to provide computational functionalities associated with described algorithms, methods, functions, processes, flows, and procedures, according to an implementation of the present disclosure.

In this disclosure, FIGS. 1 to 3 are devoted to illustrations that provide the context as well as the general framework for some implementations. FIGS. 4A and 4B demonstrate the proof of feasibility for some implementations described in this disclosure. FIGS. 5A and 5B show various operational aspects of the disclosed implementations based on the general framework provided in FIGS. 1-3. FIG. 6 provides a general architecture for conducting some implementations on computers.

For context, modern 3D land seismic data acquisition is moving from sparse grids of large source/receiver arrays to denser grids of lighter arrays or point-source, point-receiver systems. Referring to FIGS. 1 to 3, an example 100 is illustrated in FIG. 1 showing the schematic placement of subset of seismic traces (102) on a 2D plane for analyzing and enhancing reflection seismic data. In this diagram, each seismic trace corresponds to a particular placement of the shot source and a particular placement of the recording instrument, as arranged on the 2D plane. This diagram provides a general framework for illustrating the operational aspects of various implementations including parametric traces 104, and an enhanced trace 103 and various apertures (including the summation aperture 105, the estimation aperture 106, and the operator aperture 107).

FIG. 2 is a diagram 200 illustrating an example of a configuration for placing a source line 202 of source elements for transmitting acoustic impulses into the earth and a receiver line 204 of recording instruments for recording acoustic signals. This configuration may be known as a cross-spread gather. As illustrated in FIG. 2, each source, A through N, on the source line (also known as an inline) represents a seismic source configured to generate the seismic wave in the underlying earth; and each receiver, I through XIV, on the receiver line (also known as crossline) represents a recording instrument/device such as a geophone configured to record seismic reflections in response to the excitation. Each excitation may involve one source device on the source line; while all receiver devices on the receiver line may record the reflection acoustic signal in response to the particular excitation. The excitation by one source device and the recording events for all receiver devices may be repeated until all source devices have been used. This sequence of excitation and recording event(s) may be known as a cross-spread gather. FIG. 3 is a diagram showing an example of trace distribution in the plane representing source Y (vertical axis) and receiver X (horizontal axis) coordinates for the cross-spread gather of FIG. 2. Here, each trace manifests as one dot on the grid. As discussed, each trace corresponds to one recording from a recording device (represented by a receiver position along the horizontal X axis) in response to shot input from a source device (represented by a shot position along the vertical Y axis). Modern land seismic data are characterized by fine and uniform sampling along source and receiver lines, as evidenced by the vast number of dots on the grid in FIG. 3 having dense distribution in both vertical and horizontal directions without missing holes.

Processing of these traces generally involve three components—data enhancement, stacking, and migration. A typical data enhancement may include deconvolution that often improves temporal resolution by collapsing the seismic wavelet to approximately a spike and suppressing reverberations on some field data. Stacking may generally be accompanied by velocity analysis, normal-moveout (NMO), and statics corrections. Stacking can enhance consistent reflective events from multiple recordings while attenuating uncorrelated noise, thereby increasing the signal to noise ratio (SNR). Stacking also can attenuate a large part of the coherent noise in the data, such as guided waves and multiples. The normal moveout (NMO) correction before stacking is done using the primary velocity function based on the hyperbolic moveout assumption, as will be discussed in more detail. Because multiples have larger moveout than primaries, the multiples are undercorrected and, hence, attenuated during stacking. Data acquired on land must be corrected for elevation differences at shot and receiver locations and traveltime distortions caused by a near-surface weathering layer. The corrections usually are in the form of vertical traveltime shifts to a flat datum level (statics corrections). Because of uncertainties in near-surface model estimation, residual statics may need to be removed from data before stacking. The last component, migration, may collapse diffractions and moves dipping events to their putative subsurface locations. In other words, migration is an imaging process and also a deterministic process.

As mentioned earlier, modern 3D land seismic data acquisition is moving from sparse grids of large source/receiver arrays to denser grids of lighter arrays or point-source, point-receiver systems. Such 3D land acquisition improves sampling of the seismic wave field while potentially reducing signal-to-noise ratio in the acquired acoustic signals. In principle, with better sampling of signal and noise improved seismic images can be obtained. Achieving such improvement in practice can be challenging because the huge amounts of data may exhibit low signal-to-noise ratio (SNR). Conventional time processing tools such as surface-consistent scaling, statics correction, deconvolution and velocity analysis may require reliable pre-stack migration performed on the acquired 3D land seismic data. Adapting such time processing tools to the modern datasets acquired with small group size often leads to unreliable results because the derived operators may be based on noise but not necessarily on signal. To make full use of the densely spaced acquisition grid with high channel counts, as evidenced by the illustration in FIG. 3, signal enhancement in the pre-stack data can be performed.

To improve the signal-to-noise ratio (SNR) in the pre-stack data, while preserving the original geometry, some implementations may perform local summation of the neighboring traces gathered from the original dataset. Such implementations described in this disclosure may perform non-linear beamforming to enhance the 3D pre-stack data acquired with modern land seismic orthogonal surveys. As explained in more detail later, these implementations may perform a variant of delay-and-sum (DAS) beamforming, which is a non-linear function of the distance between a source device and a receiver device.

In one example, the neighboring traces may be along predefined trajectories which correspond to locally coherent reflection arrivals and can be expressed as:

$$u(x_0, y_0, t_0) = \sum_{(x,y) \in B_0} w(x, y) u(x, y, t_0 + \Delta t(x, y)), \quad (1)$$

where u (x, y, t) represents a trace with two spatial coordinates x and y. The coordinates of the output trace after the beamforming procedure are given by $x_0$, $y_0$. In this example, The summation is performed over a local region $B_0$ around the output trace in 2D plane along a trajectory with a moveout term of $\Delta t(x, y)$. In this example, the output trace corresponds to enhancement trace 103 and the local region $B_0$ around the output trace corresponds to the summation aperture 105. In some instances, the wavefront can be locally approximated by a second-order surface providing the following relation for this moveout term:

$$\Delta t = t(x,y) - t_0(x_0, y_0) = A\Delta x + B\Delta y + C\Delta x \Delta y + D\Delta x^2 + E\Delta y^2, \quad (2)$$

where A, B, C, D, E are unknown beamforming coefficients and $\Delta x$ and $\Delta y$ represent shifts of the summed trace with respect to the output trace. The beamforming weights w(x, y) can be chosen in a number of ways and are used to preserve signal energy and to suppress noise. The beamforming coefficients A, B, C, D and E have particular physical meaning in various models of mild complexity. Some implementations may first compute a two-parametric scan of A and D by setting $\Delta y$ to zero. These implementations may then follow up with another scan of B and E by setting $\Delta x$ to zero. Finally, these implementations may fix the estimated four coefficients and search for optimal value of C. To improve the results and efficiency of the search, the implementations may use the operator-oriented approach in which the moveout coefficients are estimated on a coarse grid in 2D plane by using all traces falling inside an estimation aperture 106, as illustrated in FIG. 1. After the estimation, these implementations may construct operators around all parametric traces. For each actual trace inside the operator aperture 107, as illustrated in FIG. 1, the traces falling inside the summation aperture are summed up according to equation (1). This operator-oriented approach may bring signal in each sample from different estimated operators, thereby providing a boost to the enhanced trace and a partial resolution of conflicting dips.

FIGS. 4A and 4B respectively show an example of a fragment of cross-spread gather traces before and after enhancement of 3D pre-stack land seismic data according to some implementations of the present disclosure. This fragment includes three (3) 2D crossline sections. The improvement comes in at least two folds. First, the reflected events become more visible and coherent. Second, the noisy traces were suppressed in each 2D crossline section after the enhancement. The improvement may largely stem from the enhancement performed by various implementations to preserve azimuth contributions.

Specifically, implementations that enhance 3D seismic data in common-offset domain may proceed by staying the spatial coordinates in equation (1) for inline and cross-line common-midpoint positions. Considering modern orthogonal land seismic acquisitions, such approach may not be azimuth preserving, meaning that the different azimuths may be merged during the enhancement process of these implementations. Preserving of azimuthal contributions, however, can characterize horizontal transverse anisotropy which can provide insight into, for example, fracture orientations inside a reservoir. A straightforward approach to use azimuth-dependent common offset gathers leads to very sparse gathers that do not provide regular and sufficient traces distribution. Implementations described in this disclosure can overcome such deficiencies, thereby improving the quality of reflection seismic data such that more details of the earth layers can be revealed.

In more detail, to achieve data-enhancement in cross-spread domain, some implementations described in this disclosure may consider the initial 3D seismic dataset as a five-dimensional array, where each trace is characterized by shot coordinates $X_S$, $Y_S$, receiver coordinates $X_G$, $Y_G$, and time t. The first stage of these implementations is sorting of the 3D dataset into a number of so called "cross-spread" gathers as illustrated earlier in FIG. 2. The cross-spread gather is a section of initial five (5) dimensional data cube with $X_S$=const, $Y_G$=const. Traces in this gather are characterized by three coordinates ($Y_S$, $X_G$, t). In modern land surveys, such feature provides dense and quite regular traces coverage of the source and receive space in the 2D plane ($Y_S$, $X_G$), as illustrated earlier in FIG. 3. In some instances, this 2D plane provides a spatial index to perform nonlinear beamforming according to equations (2) and (3).

One advantage of the common-offset domain is that, in models of mild complexity, events are affected mostly by structural features of the subsurface, leading to an efficient search of optimal summation trajectories. In comparison, in the cross-spread domain, such events have large travel-time moveouts that can significantly slow down search of optimal parameters. To address this apparent hindrance, implementations described in this disclosure may perform normal moveout correction (NMO) before data enhancement and subsequently perform inverse NMO after data enhancement. The NMO correction makes the reflected events more or less flat and improves efficiency of the searching algorithm in cross-spread domain. Precise NMO velocity estimation may not be necessary because the implementations are not limited to flat events only. The intervals for possible dips and curvatures of the events may be predefined by the user. In fact, implementations incorporating the NMO correction provides flexible data enhancement for modern data sets from densely sampled grids. To improve accuracy of velocity estimation, the user can reduce the searching intervals and enhance only the primary reflections and suppress unwanted events such as multiples. Conversely, when the available velocity estimation is not accurate, the user can enhance wider spectrum of events and suppress the unwanted ones at the later stages of the procedure.

FIG. 5A shows an example of a flow chart 500 for some implementations of data enhancement before stacking. Initially, a computer processor may access reflection seismic data (501). The volume of reflection seismic data may be acquired by using source devices and receiver devices placed in a mesh structure that covers an area, as illustrated earlier in FIG. 3. The processor may then sort seismic data obtained by such land orthogonal acquisition into a set of cross-spread gathers (502). The cross-spread gathers may involve a source line and a receiver line, as illustrated earlier in FIG. 2. The processor may then apply, for each cross-spread gather, normal-moveout corrections (NMO) to make primary reflections arrivals more or less flat (503). Here, the processor may perform, for each cross-spread gather, a procedure for estimating beamforming parameters that defines a nonlinear traveltime surface for improved local stacking (504). Examples of such estimation have been disclosed earlier, for example, in association with FIG. 1. The processor may then perform beamforming by fast and efficient local stacking of traces in each cross-spread gather (505) along the estimated traveltime surface, for example, from the summation aperture. The processor may then apply inverse NMO correction to restore temporal arrangements from the original reflection seismic data prior to moveout (506). In this manner, the azimuth contributions may be preserved while the computation in the cross-spread domain remains efficient because NMO computations are limited for local stacking from a summation aperture. In some implementations, the processor may then pursue additional data enhancement (507). Examples of additional data enhancement may include deconvolution. Thereafter, the processor may perform stacking based on the enhanced data (508), and migration to generate images of the layered structures with depth information resolved (509). These images of the layered structures may then be displayed (510).

Modern land data surveys include huge amount of traces and can reach hundreds megabytes of digital data or more. This sheer size can require optimization and parallelization of data-processing for analysis. Some implementations may incorporate parallel and independent enhancement of different cross-spread gathers on separate cluster nodes on, for example, a parallel computer. To optimize calculations for each cross-spread gather, some implementations may incorporate an efficient "parameter trace oriented" summation algorithm. This summation algorithm runs on the last stage of the operator-oriented data-enhancement procedure (for example, step 505 in FIG. 5A) and performs local summation of neighboring traces to produce an output dataset with increased signal-to-noise ratio. In these implementations, the signal is first accumulated in the operator trace and then moved to the target trace, Compared to the straightforward approach where the signal is accumulated in the target trace from the very beginning, some implementation described in this disclosure may allow a speedup of several factors.

In some implementations, the "parameter trace oriented" summation algorithm starts from a loop over all parameter traces (as illustrated by parameter trace 104 for estimating optimal moveout in FIG. 1). As illustrated in the diagram 511 from FIG. 5B, during this stage, the current parameter trace is initialized with zeros (as illustrated in loop 512 of FIG. 5B) and two temporary arrays DATAPAIR and INDPAIR are filled (as illustrated in loop 513 of FIG. 5B). Sizes of these arrays may be equal to the number of input traces inside the estimation aperture multiplied by the number of time samples in the operator trace (as illustrated in loop 514 of FIG. 5B). The INDPAIR table is filled by indexes of time samples where local moveout surfaces—as outline by equation (2)—from the current operator trace intersect the input traces inside the aperture (as illustrated in loops 515 and 516). The number of these traveltime surfaces is equal to the number of time samples in the operator trace. The DATAPAIR table is filled by the values of seismic trace taken at the intersection times. When the intersection occurs between actual time samples, an interpolation may be performed to take this intersection into account. After the DATAPAIR and INDPAIR tables are filled, the actual summation is done inside two other embedded loops. The first of these loops is running over target traces from the estimation aperture (as illustrated by estimation aperture 106 of FIG. 1). If the current target trace is within the operator aperture (as illustrated by operator aperture 107 from FIG. 1) relative to the current operator trace, the execution is passed to the next loop over input traces. Thereafter, if the current input trace is within the summation aperture (as illustrated by summation aperture 105 from FIG. 1) relative from the current target trace, the values for this input trace from DATAPAIR array are added to the current operator trace. After all input traces are checked, the summation algorithm brings the signal from the calculated operator trace to the target trace using the INDPAIR array. In the illustrations described earlier, the target output traces coincide with the input traces. When target output traces do not coincide with the input traces, a straightforward modification can account for the variation.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device.

Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described seismic data 616.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or to more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for analyzing reflection seismic data, the computer-implemented method comprising:
   sorting the reflection seismic data into sets of data sections acquired from cross-spread gathers, each cross-spread gather corresponding to a source line of shot sources from which seismic impulses were transmitted, and a receiver line of recording instruments where a set of data section for a particular cross-spread gather was recorded;
   performing data enhancement on the sets of data sections to generate enhanced traces for each set of data section acquired from the particular cross-spread gather, wherein the performing includes:
      applying, for each set of data section acquired from the particular cross-spread gather, forward normal-moveout (NMO) corrections;
      estimating, for a particular set of data section, beamforming parameters including a summation aperture;
      performing beamforming, on the particular set of data section and according to the beamforming parameters, to generate the enhanced traces that combine contributions from original traces in the sets of data sections, each enhanced trace azimuthally surrounded by one or more original traces in the sets of data sections, and each enhanced trace located from the summation aperture; and
      applying inverse NMO corrections to the enhanced traces, and performing additional data processing steps based on the enhanced traces leading to an improved image of a subsurface.

2. The computer-implemented method of claim 1, wherein the enhanced traces are generated by performing data enhancement in parallel.

3. An apparatus, comprising:
   at least one processor; and
   one or more non-transitory computer-readable storage medium coupled to the at least one processor and storing programming instructions for execution by the at least one processor, wherein the programming instructions, when executed, cause the apparatus to perform operations comprising:
      sorting reflection seismic data into sets of data sections acquired from cross-spread gathers, each cross-spread gather corresponding to a source line of shot sources from which seismic impulses were transmitted, and a receiver line of recording instruments where a set of data section for a particular cross-spread gather was recorded;
      performing data enhancement on the sets of data sections to generate enhanced traces for each set of data section acquired from the particular cross-spread gather, wherein the performing includes:
         applying, for each set of data section acquired from the particular cross-spread gather, forward normal-moveout (NMO) corrections;
         estimating, for a particular set of data section, beamforming parameters including a summation aperture;
         performing beamforming, on the particular set of data section and according to the beamforming parameters, to generate the enhanced traces that combine contributions from original traces in the sets of data sections, each enhanced trace azimuthally surrounded by one or more original traces in the sets of data sections, and each enhanced trace located from the summation aperture; and
         applying inverse NMO corrections to the enhanced traces; and
      performing additional data processing steps based on the enhanced traces leading to an improved image of a subsurface.

4. The apparatus of claim 3, wherein the enhanced traces are generated by performing data enhancement in parallel.

5. One or more non-transitory computer-readable media storing computer instructions, that, when executed by one or more processors, cause a computing device to perform operations comprising:
   sorting reflection seismic data into sets of data sections acquired from cross-spread gathers, each cross-spread gather corresponding to a source line of shot sources from which seismic impulses were transmitted, and a receiver line of recording instruments where a set of data section for a particular cross-spread gather was recorded;
   performing data enhancement on the sets of data sections to generate enhanced traces for each set of data section acquired from the particular cross-spread gather, wherein the performing includes:
      applying, for each set of data section acquired from the particular cross-spread gather, forward normal-moveout (NMO) corrections;
      estimating, for a particular set of data section, beamforming parameters including a summation aperture;
      performing beamforming, on the particular set of data section and according to the beamforming parameters, to generate the enhanced traces that combine contributions from original traces in the sets of data sections, each enhanced trace azimuthally surrounded by one or more original traces in the sets of data sections, and each enhanced trace located from the summation aperture; and
      applying inverse NMO corrections to the enhanced traces; and
   performing additional data processing steps based on the enhanced traces leading to an improved image of a subsurface.

6. The one or more non-transitory computer-readable media of claim 5, wherein the enhanced traces are generated by performing data enhancement in parallel.

* * * * *